United States Patent [19]

Sarrazin

[11] 4,416,391

[45] Nov. 22, 1983

[54] SEALS-CAPS FOR FUEL TANKS

[75] Inventor: Jean-Michel Sarrazin, Sainte Luce sur Loire, France

[73] Assignee: Compagnie des Produits Industriels de l'Ouest, Nantes, France

[21] Appl. No.: 408,046

[22] Filed: Aug. 13, 1982

[30] Foreign Application Priority Data

Aug. 13, 1981 [FR] France .............................. 81 15667

[51] Int. Cl.³ .............................................. B65D 53/00
[52] U.S. Cl. .................................... 220/304; 220/295; 220/DIG. 32; 220/DIG. 33
[58] Field of Search ............... 220/293, 295, 301, 302, 220/304, DIG. 32, DIG. 33

[56] References Cited

U.S. PATENT DOCUMENTS 3,703,245 11/1972 Brewer ...................... 220/DIG. 32
4,081,102 3/1978 Sakai .................................. 220/295
4,294,375 10/1981 Gerdes ................................ 220/304

FOREIGN PATENT DOCUMENTS 2630972 1/1978 Fed. Rep. of Germany .
2185238 12/1973 France .
2274850 1/1976 France .

Primary Examiner—George T. Hall
Attorney, Agent, or Firm—Oblon, Fisher, Spivak, McClelland & Maier

[57] ABSTRACT

A seal cap, particularly for fuel tanks, is provided, having a body comprising a cylindrical prolongation directed toward a fuel tank spout, in which fits a wing supporting element, such wings travelling along a helicoidal gradient located inside the spout, a seal gasket preferably being welded between a shoulder of the element and the lower edge of the cylindrical prolongation, and a U-shaped ring being pushed against the gasket by a spring means which rests upon the inner side of the cap.

5 Claims, 5 Drawing Figures

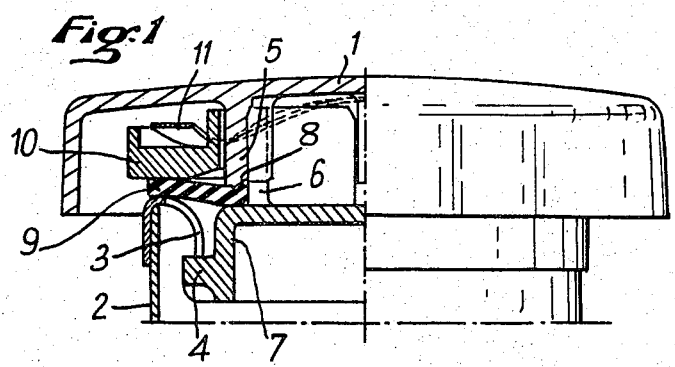
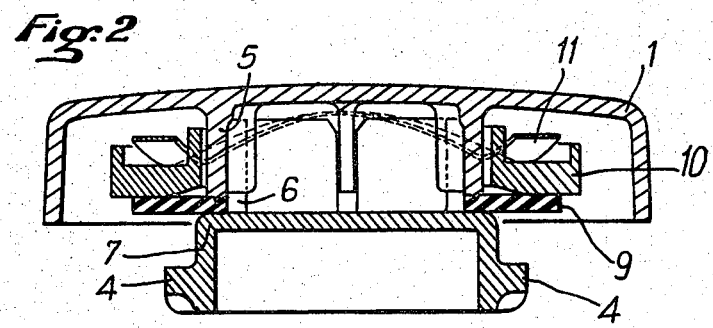
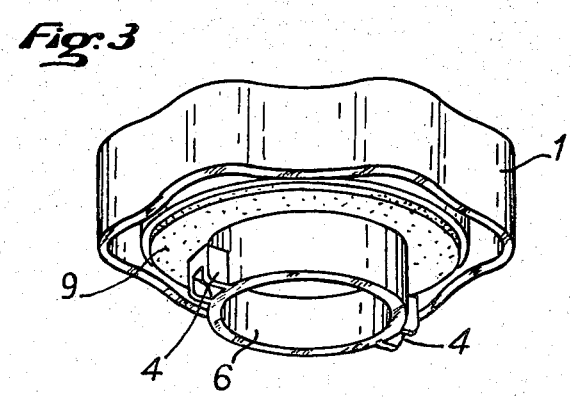
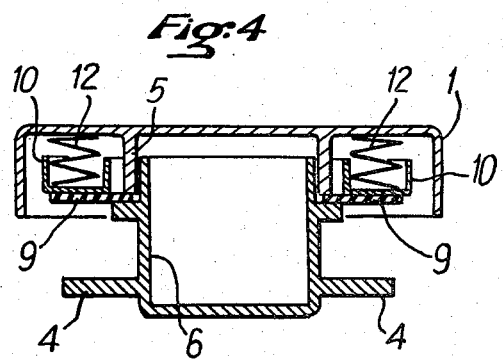
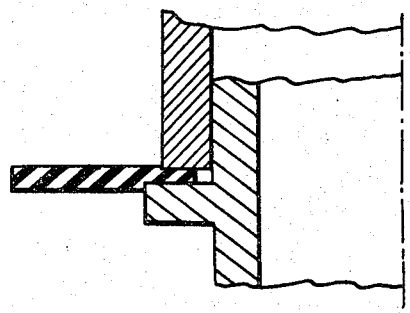

SEALS-CAPS FOR FUEL TANKS

BACKGROUND OF THE INVENTION

1. Field of the Invention

The present invention relates to the manufacture of seal-caps having constant torque and a flat gasket, to be used particularly for automobile fuel tanks or crankcases.

2. Description of the Prior Art

At present, such caps are equipped with flat rubber gaskets which do not provide a positive seal and are not easy to put on and remove.

In fact, the caps must meet certain other requirements which involve design compromises which have not proved very satisfactory.

A perfect seal requires a strong tightening torque to screw on the cap. Easy mounting would therefore entail gas leaks in some cases.

This invention aims at eliminating the difficulties outlined herein while allowing for a constant force of compression of the cap gasket onto the spout into which fuel is introduced, thus assuring an excellent seal, without modifying the torque to be exerted upon the cap while it is being screwed on. The seal is also assured by a flat gasket made of an elastomer, which is easy to manufacture and is low in cost.

BRIEF DESCRIPTION OF THE DRAWINGS

The present invention will now be described with reference being made to the attached drawings, wherein like reference numerals designate like or corresponding parts throughout the several views, and in which:

FIG. 1 is a view, partly in section, of one embodiment of the cap of the present invention taken along a plane passing through its longitudinal axis, showing its structure in the mounted position on a spout;

FIG. 2 is a similar view of the cap off the spout;

FIG. 3 is a bottom view of the cap;

FIG. 4 is a section similar to that of FIGS. 1 and 2 of another embodiment of the cap; and FIG. 5 is an enlarged detail of FIG. 4, showing the fastening of a gasket.

DETAILED DESCRIPTION OF THE PREFERRED EMBODIMENTS

Referrng now more specifically to the drawings and particularly to FIG. 1, there is shown a cap-body 1, preferably made of a synthetic material, the fuel tank spout 2 onto which it is applied, and the helicoidal gradient 3 of spout 2, along which the upper section of the two wings 4 of the cap travel.

The body of cap 1 comprises an internal cylindrical prolongation 5 directed toward the spout, into which fits an element 6 supporting wings 4. The element 6 has a shoulder 7 facing a lower edge 8 of the cylindrical prolongation 5, with a natural or synthetic flat rubber gasket 9 being tightly wedged between those two tightening means.

A U-shaped ring 10, concentric with prolongation 5, is supported by the gasket 9. Inside of ring 10 is placed a flat spring 11, or according to the embodiment of FIG. 4, several helicoidal springs 12.

The seal of the spout 2 is assured by the gasket 9 whose inner edge is compressed between the shoulder 7 of element 6 and the edge 8 of prolongation 5. These two pieces are linked in an appropriate position by any suitable means such as clamping, welding, ultra-sound, etc. The outer edge of gasket 9 is pushed against spout 2 by the force of springs 11,12. This is achieved with constant force, through ring 10. The ring 10, moving along the axis of the cap against springs 11,12, balances the pushing in of the cap as wings 4 describe the helicoidal gradient 3 located inside spout 2. This arrangement thus enables one to exert a practically constant rotational couple upon the cap during the whole operation of sealing the spout.

When the wings 4 of element 6 of the cap are stopped at the end of gradient 3 (with the height of ring 10 and characteristics of gradient 3 having been defined accordingly), ring 10 comes into contact with the bottom side of cap 1, thus preventing any additional progress past the stopping point.

From the preceding, it can be seen that the device of the present invention enables a tight seal, though it only requires a limited, constant tightening torque, requiring no particular effort to bring the cap in locked position.

Moreover, this is obtained with a simple flat rubber gasket which can be stamped out and is therefore relatively inexpensive to produce, compared to heretofore provided means for fulfilling the same function.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A seal-cap, particularly for fuel tanks, comprising a body having a cylindrical prolongation directed toward a spout of the fuel tank, an element formed thereon having radially extending wings which travel along a helicoidal gradient located inside said fuel spout, a seal gasket being welded between a shoulder of said element and the lower edge of said cylindrical prolongation, a U-shaped ring being urged against said gasket by spring means which rest upon the inner side of said cap.

2. A seal-cap according to claim 1, wherein said seal gasket is a natural or synthetic flat rubber gasket, preferably a stamped-out gasket.

3. A seal-cap according to claim 1, wherein said spring means is a flat spring.

4. A seal-cap according to claim 1, wherein said spring means is a helicoidal spring disposed on several points of said ring.

5. A seal-cap according to claim 1, characterized in that the dimensions of said ring and said helicoidal gradient are defined in a way to bring said ring into contact with the lower edge of said cap, as said wings of said element are stopped at the end of the gradient.

* * * * *